United States Patent
Pai et al.

(10) Patent No.: US 7,619,394 B2
(45) Date of Patent: *Nov. 17, 2009

(54) CAPACITOR CHARGER WITH A MODULATED CURRENT VARYING WITH AN INPUT VOLTAGE AND METHOD THEREOF

(75) Inventors: Chung-Lung Pai, Taipei (TW); Kwan-Jen Chu, Hsinchu (TW); Chun-Yen Huang, Jhubei (TW); Jing-Meng Liu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 208 days.

This patent is subject to a terminal disclaimer.

(21) Appl. No.: 11/017,906

(22) Filed: Dec. 22, 2004

(65) Prior Publication Data

US 2005/0140340 A1 Jun. 30, 2005

(30) Foreign Application Priority Data

Dec. 25, 2003 (TW) .............................. 92136915 A (51) Int. Cl.
 *H02J 7/00* (2006.01)
(52) U.S. Cl. ...................... 320/166; 320/136; 320/134; 320/140
(58) Field of Classification Search ................. 320/166, 320/134, 136, 140; 323/301, 207, 222, 224, 323/282–286; 315/207, 247, 224
See application file for complete search history.

(56) References Cited

U.S. PATENT DOCUMENTS

| | | | | |
|---|---|---|---|---|
| 4,422,016 A * | 12/1983 | Kurple | ..................... | 315/241 S |
| 5,680,348 A * | 10/1997 | Chung et al. | ........... | 365/185.23 |
| 6,005,370 A * | 12/1999 | Gustavson et al. | .......... | 320/137 |
| 6,674,275 B2 * | 1/2004 | Darzy | ........................ | 323/316 |
| 7,170,763 B2 * | 1/2007 | Pai et al. | ................... | 363/21.16 |
| 2003/0155899 A1 * | 8/2003 | Oglesbee et al. | ............ | 323/284 |

FOREIGN PATENT DOCUMENTS

| | | |
|---|---|---|
| JP | 63-261699 | 10/1988 |
| JP | 01-138544 | 5/1989 |
| JP | 05-083871 | 4/1993 |
| JP | 05-181183 | 7/1993 |

OTHER PUBLICATIONS

Philips Semiconductors; Datasheets for NE/SE5560; Aug. 31, 1994; Philips Semiconductors; pp. 1-16.*

* cited by examiner

*Primary Examiner*—Bao Q Vu
*Assistant Examiner*—Jue Zhang
(74) *Attorney, Agent, or Firm*—Rosenberg, Klein & Lee (57) ABSTRACT

In a capacitor charger including a transformer having a primary winding connected with an input voltage and a secondary winding for transforming a primary current flowing through the primary winding to a secondary current flowing through the secondary winding, the primary current is adjusted according to a monitoring voltage varying with the input voltage, thereby prolonging the lifetime of the battery that provides the input voltage and improving the power efficiency of the battery.

17 Claims, 7 Drawing Sheets

CAPACITOR CHARGER WITH A MODULATED CURRENT VARYING WITH AN INPUT VOLTAGE AND METHOD THEREOF

FIELD OF THE INVENTION

The present invention is related generally to a capacitor charger, and more particularly, to a modulation apparatus and method for the charging current in a capacitor charger varying with the input voltage of the capacitor charger.

BACKGROUND OF THE INVENTION

Figure 1:
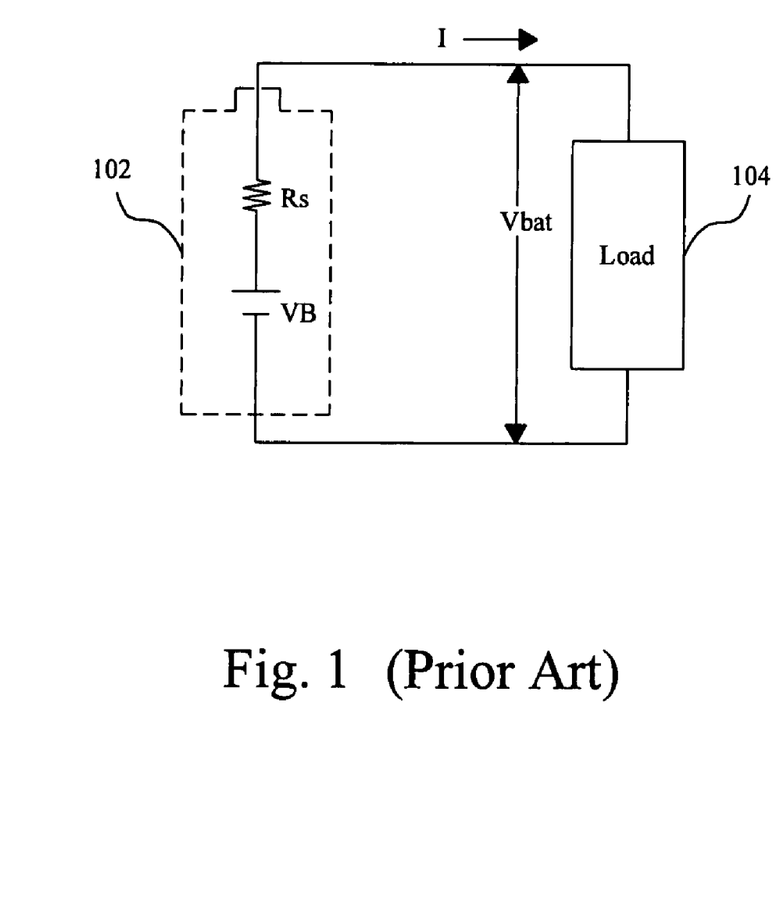
FIG. 1 is an illustrative diagram of a battery providing a voltage and a current to a load.

Portable apparatus is more and more popular, and therefore capacitor charger it uses receives more attentions than ever. Furthermore, battery is typically used for the capacitor charger, since it is the portable apparatus to employ the capacitor charger. Unfortunately, there are disadvantages to a battery serving as a power source. FIG. 1 is an illustrative diagram of a battery 102 providing a voltage $V_{bat}$ and a current I to a load 104. Internally, the battery 102 includes a equivalent resistor $R_S$ and a voltage source $V_B$, and the voltage $V_{bat}$ it provides equals to the source voltage $V_B$ subtracting the voltage drop across the internal resistor $R_S$ as $$V_{bat} = V_B - I \times R_S.  \quad [\text{EQ-1}]$$

Figure 2:
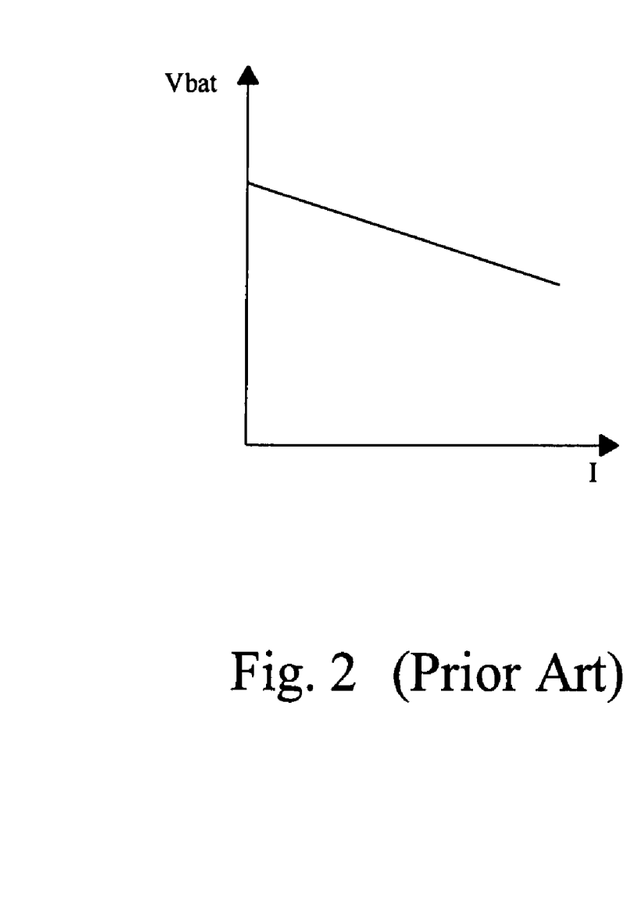
FIG. 2 shows an I-V curve of the battery in FIG. 1 for the voltage and the current it supplies.

FIG. 2 shows an I-V curve of the battery 102 for the voltage $V_{bat}$ and the current I it supplies, in which the vertical axis represents the supplied voltage $V_{bat}$, and the horizontal axis represents the loading current I. From the equation EQ-1, the voltage $V_{bat}$ varies with the current I, as shown by the I-V curve in FIG. 2, the more the current I is drawn by the load 104, the lower the voltage $V_{bat}$ is provided by the battery 102. When the voltage $V_{bat}$ becomes lower, the load 104 intends to draw more current I from the battery 102, and it will have the voltage $V_{bat}$ to be further lower, thereby lowering the power efficiency and shortening the lifetime of the battery 102. When a battery is used to provide the power for a capacitor charger, the battery cannot provide satisfied efficiency and lifetime.

Therefore, it is desired a modulation apparatus and method for a capacitor charger to improve the power efficiency and prolong the lifetime of the battery the capacitor charger uses.

SUMMARY OF THE INVENTION

One object of the present invention is to provide a capacitor charger and the modulation method thereof whose charging current varies with the input voltage, especially supplied by a battery.

Another object of the present invention is to provide a capacitor charger and the modulation method thereof that could improve the power efficiency and prolong the lifetime of the battery the capacitor charger uses.

In a capacitor charger connected with an input voltage, according to the present invention, a transformer transforms a primary current flowing through its primary winding to a secondary current flowing through its secondary winding under the control of a current control circuit for modulating the primary current, and a current set circuit is connected to the current control circuit to adjust the primary current according to a monitoring voltage varying with the input voltage.

Since the monitoring voltage is generated depending on the input voltage, the current set circuit could monitor the variation of the input voltage from the monitoring voltage, and therefore, to have the current set circuit to adjust the primary current when the input voltage is varied or lower than a threshold, thereby improving the power efficiency and prolonging the lifetime of the battery that provides the input voltage.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

The cut-off voltages of alkaline battery and lithium battery under various loading currents are provided in Table 1, where the cut-off voltage is referred to the minimum of the internal source voltage $V_B$ in the battery.

TABLE 1

| Battery Type | Internal Resistance | Set No Load Cut-Off Voltage, $V_{bat}$ = 2 V | Load 0.5 A Cut-Off Voltage, $V_{bat}$ = 2 V | Load 1 A Cut-Off Voltage, $V_{bat}$ = 2 V |
|---|---|---|---|---|
| 2 Cell alkaline | 0.6 Ω | 2 V | 2.3 V | 2.6 V |
| 1 Cell Li Ion | 0.2 Ω | 3 V | 3.1 V | 3.2 V |

From Table 1, it is shown that, when the loading current is higher, the cut-off voltage is also higher. Therefore, lowering the loading current to follow the lowering of the battery voltage could use the power of the battery more efficiently.

Figure 3:
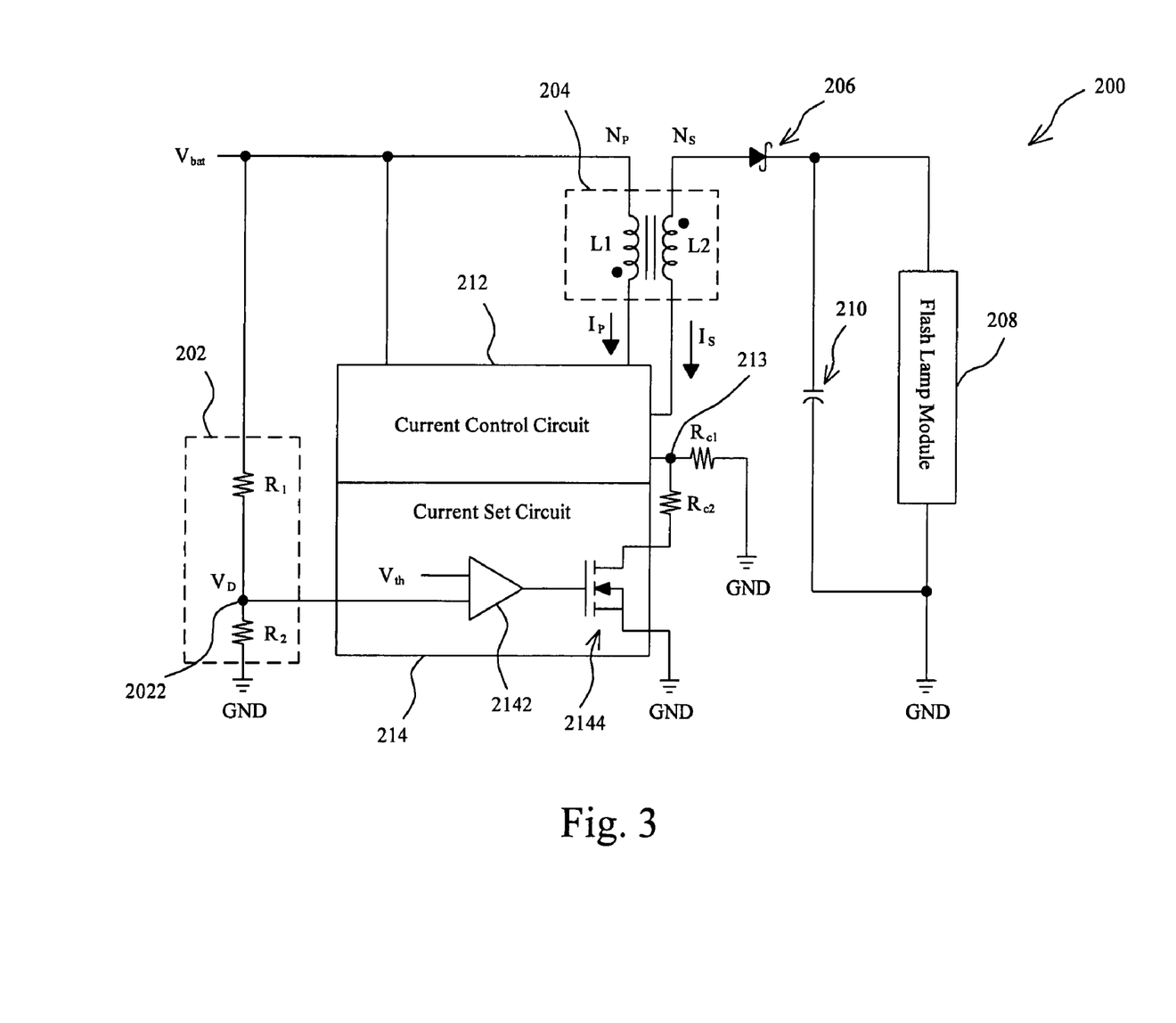
FIG. 3 shows one embodiment of the present invention in an application for a flash lamp module.

FIG. 3 shows one embodiment of the present invention in an application for a flash lamp module. A capacitor charger 200 comprises a voltage divider 202 composed of resistors $R_1$ and $R_2$ connected in series between a battery voltage $V_{bat}$ and ground GND to divide the battery voltage $V_{bat}$ to generate a monitoring voltage $V_D$ varying with the battery voltage $V_{bat}$ derived from a node 2022 between the resistors $R_1$ and $R_2$, a transformer 204 having its primary winding $L_1$ connected to the battery voltage $V_{bat}$ and its secondary winding $L_2$ connected to a flash lamp module 208 through a diode 206, a capacitor 210 shunt to the flash lamp module 208 to be charged and to supply power for the flash lamp module 208, a current control circuit 212 connected to the primary winding $L_1$ to control the primary current $I_P$, a resistor $R_{C1}$ connected between the current control circuit 212 and ground GND, another resistor $R_{C2}$ connected between the current control circuit 212 and a current set circuit 214 through a node 213 between the resistors $R_{C1}$ and $R_{C2}$. The current control circuit 212 and current set circuit 214 may be integrated in a controller chip for the capacitor charger 200. A typical power converter circuit may be used in the current control circuit 212 with an additional current set pin to connect to the node 213. The current set circuit 214 includes a comparator 2142 having two inputs connected with the monitoring voltage $V_D$ from the voltage divider 202 and a threshold $V_{th}$, respectively, to generate a comparison signal to switch a transistor 2144, so as to switch the state of the current set pin.

Figure 4A:
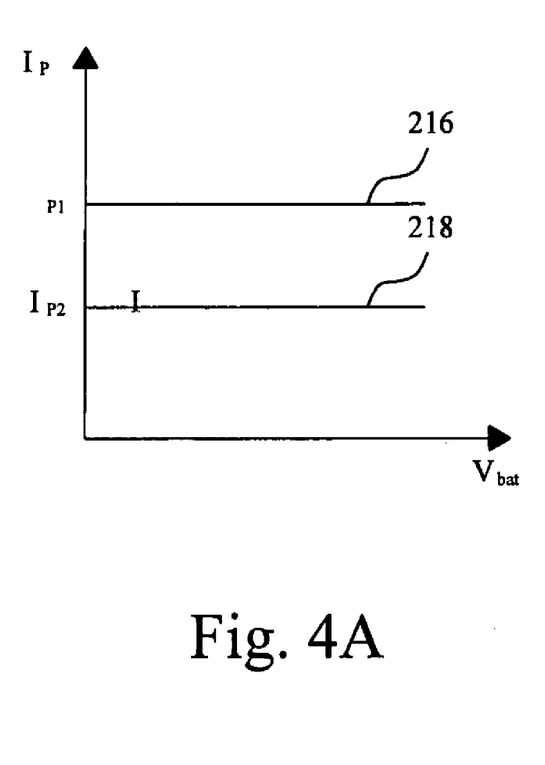
FIG. 4A shows the typical primary current $I_P$ of the capacitor charger 200 when using the alkaline battery and lithium battery listed in Table 1.
Figure 4B:
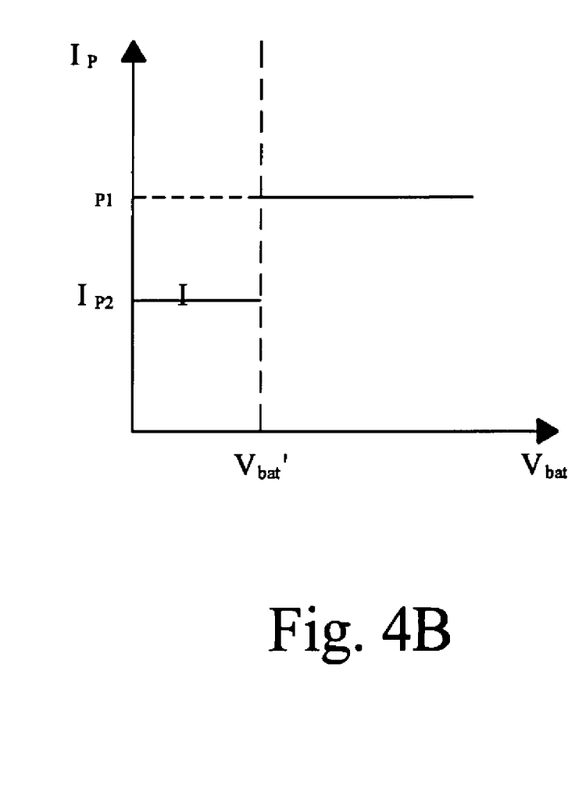
FIG. 4B shows the two-state switch for the primary current of the capacitor charger 200 in FIG. 3.

According to the present invention, the capacitor charger 200 could improve the power efficiency and prolong the lifetime of the battery that provides the input voltage $V_{bat}$ of the capacitor charger 200 by modulating the primary current $I_P$ according to the battery voltage $V_{bat}$. In this embodiment, two-state switch is designed to illustrate the principles of the present invention, i.e., the state of the current set pin is switched by the transistor 2144 depending on the monitoring voltage $V_D$ varying with the input voltage $V_{bat}$. FIG. 4A shows the typical primary current $I_P$ of the capacitor charger 200 when using the alkaline battery and lithium battery listed in Table 1, in which curve 216 represents the primary current $IP_1$ provided by lithium battery, and curve 218 represents the primary current $IP_2$ provided by alkaline battery. FIG. 4B shows the two-state switch for the primary current $I_P$ of the capacitor charger 200 in FIG. 3. In particular, under the use of lithium battery, when the battery voltage $V_{bat}$ supplied for the capacitor charger 200 is high enough, the lithium battery provides the typical primary current $IP_1$ as it usually does. While the battery voltage $V_{bat}$ drops lower than a threshold $V_{bat}'$, the capacitor charger 200 will automatically switches its primary current $I_P$ to a lower one, for example $IP_2$, by switching the transistor 2144 of the current set circuit 214 in response to the monitoring voltage $V_D$ varying with the battery voltage $V_{bat}$. Due to the switching to the lower loading current, the power efficiency of the lithium battery is improved, and the lifetime thereof is prolonged.

Figure 5:
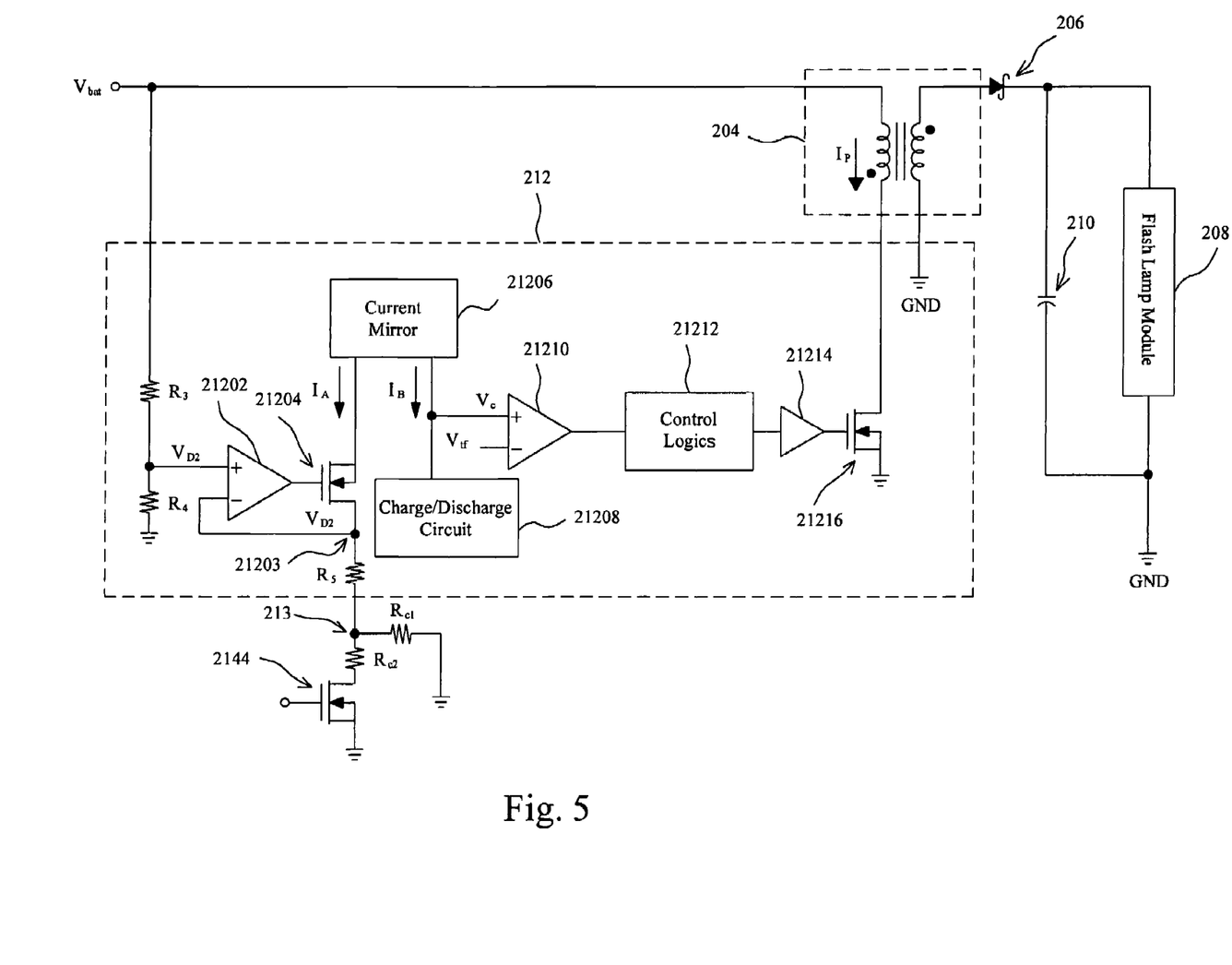
FIG. 5 shows one embodiment for the current control circuit 212 in the capacitor charger 200 of FIG. 3.

FIG. 5 shows one embodiment for the current control circuit 212 in the capacitor charger 200 of FIG. 3, which includes resistors $R_3$ and $R_4$ connected in series between the input voltage $V_{bat}$ and ground to divide the input voltage $V_{bat}$ to generate a voltage $V_{D2}$, and an operational amplifier 21202 having its non-inverting input connected with the voltage $V_{D2}$, its inverting input connected to a node 21203, and its output connected to the gate of a transistor 21204 that has its source connected to the node 21203. Due to the virtual ground between the inputs of the operational amplifier 21202, the node 21203 has the same voltage $V_{D2}$ thereon, and therefore a current $I_A$ is generated on the drain of the transistor 21204 to serve as the reference current for a current mirror 21206 to mirror therefrom to generate a mirror current $I_B$ supplied to a charge/discharge circuit 21208 to further generate a charged voltage $V_C$. A comparator 21210 compares the voltage $V_C$ with a reference $V_{tf}$ to generate a comparison signal for control logics 21212 to generate a control signal through a driver 21214 to modulate the on-time period of a transistor 21216 connected in series to the primary winding $L_1$ of the transformer 204, thereby determining the primary current $I_P$ flowing through the primary winding $L_1$. In this embodiment, the primary current $I_P$ also depends on the voltage across the resistor $R_5$ that could be adjusted by use of the equivalent resistance connected to the node 213, and therefore, the primary current $I_P$ could be adjusted by turning on and turning off the transistor 2144. Theoretically, the combination of the operational amplifier 21202, the transistor 21204 and the resistor $R_5$ is identical to a current source to provide the reference current $I_A$ dependent of the voltage $V_{D2}$ and the resistance between the node 213 and ground GND. As illustrated by FIG. 3 and FIG. 4B, together with FIG. 5, when the battery voltage $V_{bat}$ is at a higher level, the transistor 2144 is turned off, and the equivalent resistance between the node 21203 and ground GND is the summation of those of the resistors $R_5$ and $R_{C1}$. When the battery voltage $V_{bat}$ drops to a lower level to result in the monitoring voltage $V_D$ lower than the threshold $V_{th}$, the transistor 2144 is turned on, and the resistor $R_{C2}$ is subsequently shunt to the resistor $R_{C1}$ to lower the equivalent resistance between the node 21203 and ground GND, which will result in a higher reference current $I_A$ and subsequently shorten the on-time period $T_{on}$ for the switch 21216 due to shorter charging time for the voltage $V_C$ generated by the charge/discharge circuit 21208 to reach a sufficient level, so as to switch the primary current $I_P$ from the higher one $I_{P1}$ to the lower one $I_{P2}$.

Referring to FIGS. 3, 4A and 4B, by exemplarily using alkaline battery and lithium battery, the primary current $I_P$ is switched based on the curves 216 and 218 shown in FIG. 4A, i.e., the primary current $I_P$ will be $I_{P1}$ when using lithium battery, and will be $I_{P2}$ when using alkaline battery. In the beginning, the capacitor charger 200 is assumed to use lithium battery, and therefore the primary current $I_P$ is determined to be $I_{P1}$, unless or until the battery voltage $V_{bat}$ is lower than the threshold $V_{bat}'$ so as for the monitoring voltage $V_D$ on the output of the voltage divider 202 is lower than the threshold $V_{th}$, which will have the comparator 2142 to turn on the transistor 2144 to switch the primary current $I_P$ from $I_{P1}$ to $I_{P2}$, as shown in FIG. 4B. As a result, the power efficiency of the battery is improved, and the lifetime of the battery is prolonged.

Figure 6:
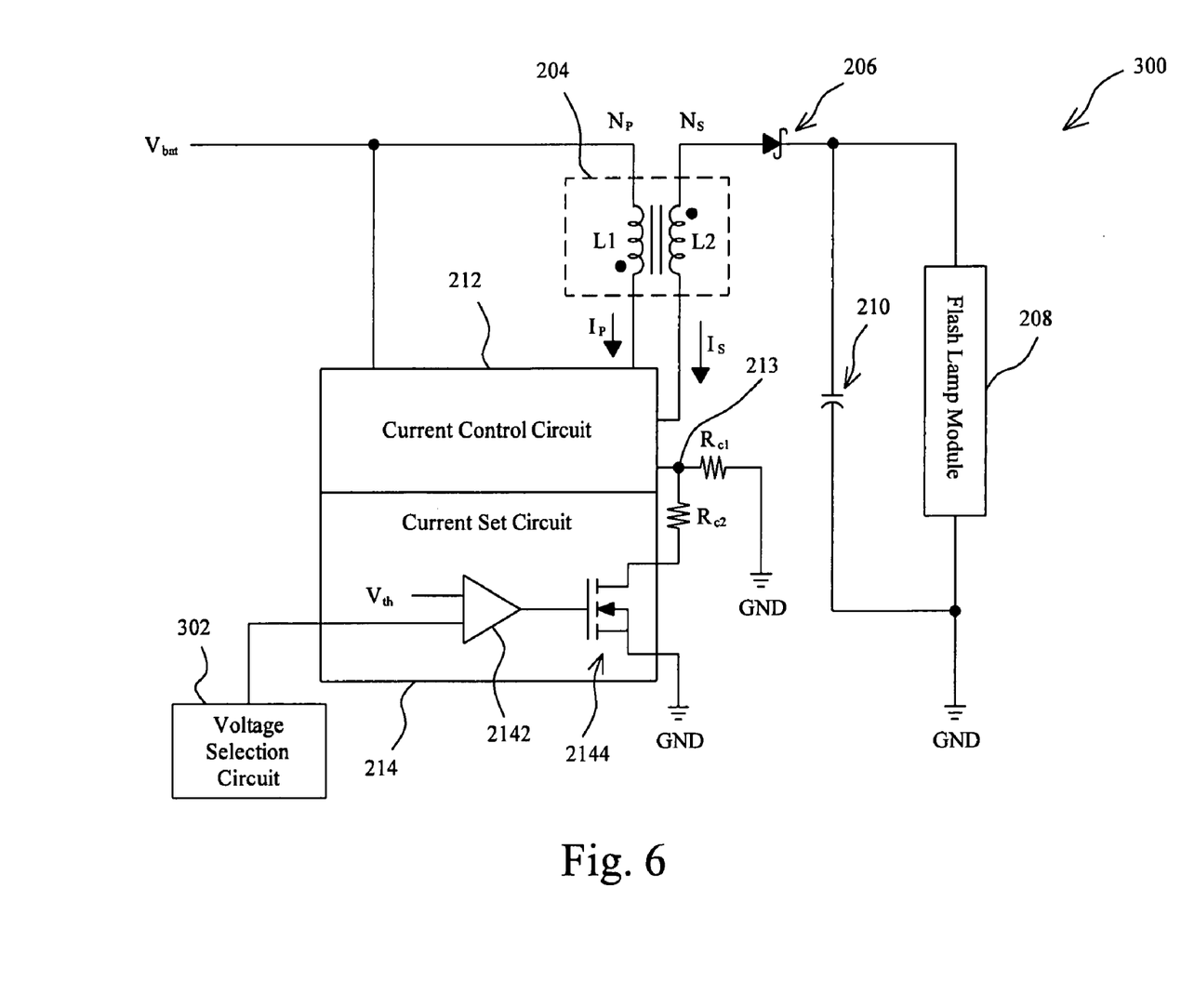
FIG. 6 shows another embodiment of the present invention in an application for a flash lamp module.

FIG. 6 shows another embodiment of the present invention in an application for a flash lamp module. In a capacitor charger 300, the architecture of the capacitor charger 200 shown in FIG. 3 is employed likewise, and the same numerals for those corresponding elements are also designated hereto, while a voltage selection circuit 302 provides the monitoring voltage $V_D$ to the current set circuit 214 for the comparator 2142 to compare with the threshold $V_{th}$ to generate a comparison signal to switch the transistor 2144. When the battery voltage $V_{bat}$ is lower than a threshold $V_{bat}'$, the voltage selection circuit 302 switches the monitoring voltage $V_D$ from one setting value to another, and thus the comparator 2142 in the current set circuit 214 may switch the transistor 2144 from one state to another, thereby changing the equivalent resistance connected to the node 213 and subsequently lowering the level of the primary current $I_P$. If the current control circuit 212 and current set circuit 214 are integrated in a controller chip, the chip has a battery type pin connected with the monitoring voltage $V_D$, and the voltage selection circuit 302 may determine the monitoring voltage $V_D$ according to the type of battery that provides the input voltage $V_{bat}$.

Figure 7:
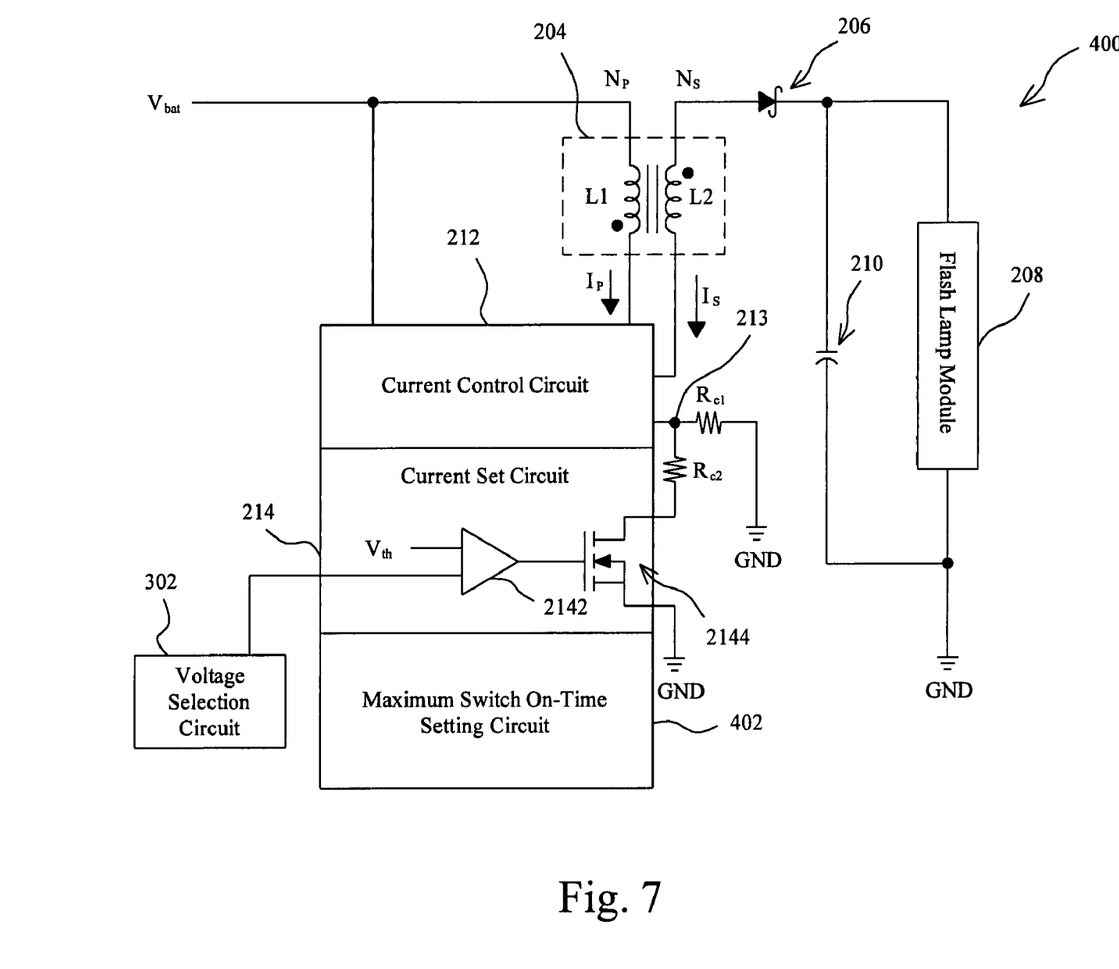
FIG. 7 shows a further embodiment of the present invention in an application for a flash lamp module.

FIG. 7 shows a further embodiment of the present invention in an application for a flash lamp module. In a capacitor charger 400, the architecture of the capacitor charger 300 shown in FIG. 6 is employed likewise, and the same numerals for those corresponding elements are also designated hereto, while a maximum switch on-time setting circuit 402 is additionally comprised in the controller chip to set the maximum of the on-time period $T_{on,max}$ to switch the primary current $I_P$, for example by the transistor 21216 in the current control circuit 212 shown in FIG. 5.

Figure 8A:
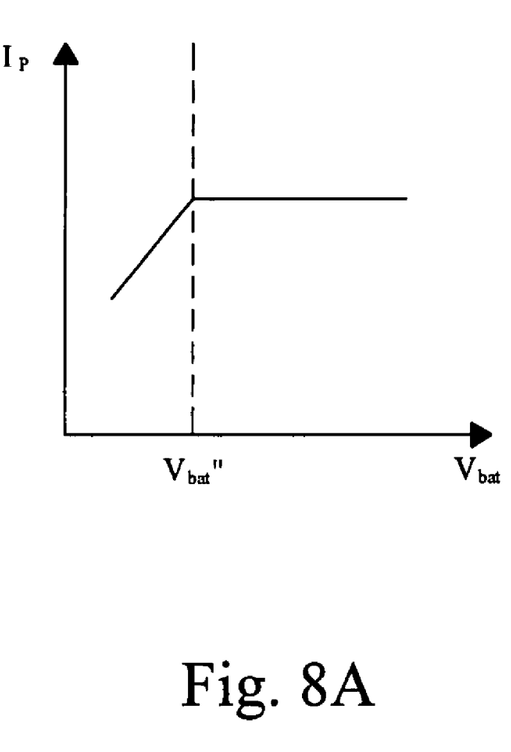
FIG. 8A shows an I-V curve of the capacitor charger 400 in FIG. 7 for its primary current $I_P$ and the battery voltage $V_{bat}$.
Figure 8B:
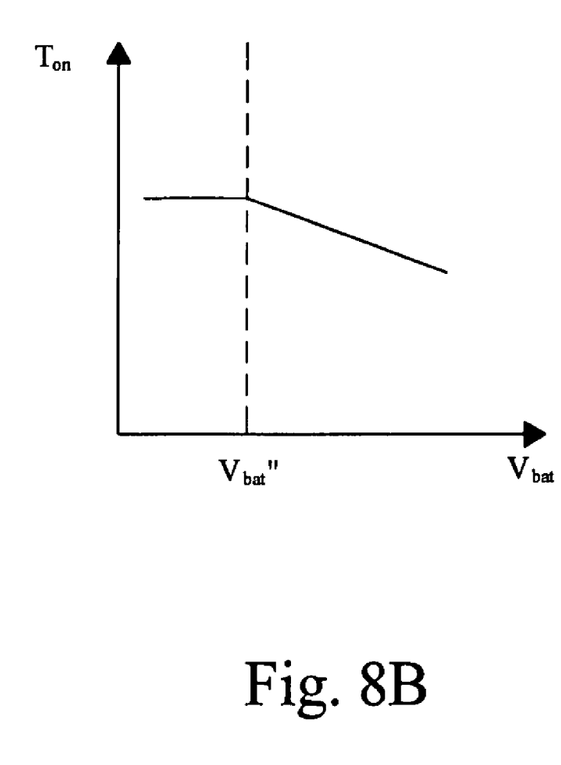
FIG. 8B shows the relationship of the on-time period $T_{on}$ for the transistor 21216 in the capacitor charger 400 and the battery voltage $V_{bat}$.

FIG. 8A shows an I-V curve of the capacitor charger 400 for its primary current $I_P$ and the battery voltage $V_{bat}$, and FIG. 8B shows the relationship of the on-time period $T_{on}$ for the transistor 21216 in the capacitor charger 400 and the battery voltage $V_{bat}$. When the battery voltage $V_{bat}$ gradually drops, the capacitor charger 400 will increase the on-time period $T_{on}$ for the transistor 21216 to maintain the primary current $I_P$ stable, until the battery voltage $V_{bat}$ touches down to a threshold $V_{bat}''$, the on-time period $T_{on}$ reaches the maximum on-time period $T_{on,max}$ set by the maximum switch on-time setting circuit 402. The variation of the primary current $I_P$ could be determined by $$\Delta I_P = \frac{V_{bat} \times T_{on}}{L_1} \quad [EQ-2]$$

As shown in FIG. 8B, when the battery voltage $V_{bat}$ drops down to touch the threshold $V_{bat}''$, the on-time period $T_{on}$ reaches the maximum on-time period $T_{on,max}$. After the battery voltage $V_{bat}$ is lower than the threshold $V_{bat}''$, the on-time period $T_{on}$ is maintained at the maximum on-time period $T_{on,max}$, and from the equation EQ-2, the variation $\Delta I_P$ of the primary current $I_P$ is proportional to the battery voltage $V_{bat}$, due to the constant on-time period $T_{on}$ and inductance $L_1$. Therefore, when the battery voltage $V_{bat}$ is lower than the threshold $V_{bat}''$, the primary current $I_P$ of the capacitor charger 400 will decrease in follow to the battery voltage $V_{bat}$, as shown in FIG. 8A, and the lifetime of the battery is prolonged.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A capacitor charger connected with an input voltage, comprising:
    a transformer having a primary winding connected with the input voltage and a secondary winding for transforming a primary current flowing through the primary winding to a secondary current flowing through the secondary winding;
    a current control circuit for maintaining a magnitude of the primary current wherein the current control circuit comprises: a switch connected to the primary winding for switching the primary current; a voltage generator for providing a first voltage varying with the monitoring voltage; a current source for providing a reference current according to the first voltage; a current mirror for mirroring the reference current to generate a mirror current; a charge/discharge circuit for generating a second voltage according to the mirror current; and
    a comparator for comparing the second voltage with a threshold to generate a comparison signal to adjust an on-time period of the switch; and
    a current set circuit connected to the current control circuit for changing the magnitude of the primary current from a first value to a second lower value responsive to a change in a monitoring voltage corresponding to a decrease in the input voltage below a certain value.

2. The capacitor charger of claim 1, further comprising a voltage generator for providing the monitoring voltage.

3. The capacitor charger of claim 2, wherein the voltage generator includes a voltage divider for dividing the input voltage to determine the monitoring voltage.

4. The capacitor charger of claim 2, wherein the voltage generator includes a voltage selection circuit for switching the monitoring voltage between a plurality of discrete setting values.

5. The capacitor charger of claim 1, wherein the current control circuit further comprises control logics for generating a control signal according to the comparison signal to chive the switch.

6. The capacitor charger of claim 1, wherein the voltage generator includes a voltage divider for dividing the input voltage to generate the first voltage.

7. The capacitor charger of claim 1, wherein the current source comprises:
    a transistor having a drain for conducting the reference current;
    an operational amplifier having a non-inverting input connected with the first voltage, an inverting input connected to a source of the transistor, and an output connected to a gate of the transistor; and
    a resistor connected to the inverting input for adjusting the reference current.

8. The capacitor charger of claim 7, wherein the current set circuit includes a second comparator for comparing the monitoring voltage with a second threshold to generate a second comparison signal to determine a resistance of the resistor.

9. The capacitor charger of claim 1, the current control circuit further comprising a maximum switch on-time setting circuit for setting a maximum on-time period for the switch, the maximum switch on-time setting circuit increasing the on-time period for the switch responsive to a decrease in the input voltage, the on-time period being at a maximum value in correspondence with the input voltage decreasing to the certain value.

10. A control method for a capacitor charger including a transformer having a primary winding connected with an input voltage and a secondary winding for transforming a primary current flowing through the primary winding to a secondary current flowing through the secondary winding, the control method comprising the steps of:
    generating a monitoring voltage varying in correspondence with changes in a magnitude of the input voltage;
    modulating the primary current by a control signal determined by a difference between a voltage corresponding to the input voltage and a reference voltage to maintain the primary current at a first magnitude during a reduction in the magnitude of the input voltage; and
    changing the reference voltage responsive to the monitoring voltage reaching a threshold value corresponding to the input voltage decreasing to a certain value, the changed reference voltage subsequent to said monitoring voltage reaching said threshold value changes the primary current to a second magnitude, the second magnitude being lower than the first magnitude.

11. The control method of claim 10, wherein the step of generating a monitoring voltage comprises dividing the input voltage for determining the monitoring voltage.

12. The control method of claim 10, wherein the step of generating a monitoring voltage comprises comparing the input voltage with a second threshold.

13. The control method of claim 10, wherein the step of modulating the primary current comprises the steps of:

generating a first voltage varying with the voltage corresponding to the input voltage;

generating a reference current according to the first voltage;

mirroring the reference current for generating a mirror current;

generating a second voltage according to the mirror current;

comparing the second voltage with a second threshold for generating a comparison signal to adjust an on-time switching period and switching the primary current in accordance with the on-time switching period.

14. The control method of claim 13, wherein the step of generating a first voltage includes the step of forming the voltage corresponding to the input voltage by dividing the input voltage with a voltage divider.

15. The control method of claim 13, wherein the step of generating a reference current comprises applying the first voltage across a resistance for determining the reference current.

16. The control method of claim 15, wherein the step of changing the reference voltage includes the step of switching a value of the resistance.

17. The control method of claim 13, further comprising setting a maximum for the on-time switching period of the primary current, the on-time switching period being increased responsive to a decrease in the input voltage, the on-time switching period being at a maximum value in correspondence with the input voltage decreasing to the certain value.

* * * * *

UNITED STATES PATENT AND TRADEMARK OFFICE
CERTIFICATE OF CORRECTION

PATENT NO. : 7,619,394 B2 Page 1 of 1
APPLICATION NO. : 11/017906
DATED : November 17, 2009
INVENTOR(S) : Pai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 272 days.

Signed and Sealed this

Fourteenth Day of December, 2010

David J. Kappos
*Director of the United States Patent and Trademark Office*